United States Patent
Hiratsuka

(10) Patent No.: US 9,575,935 B2
(45) Date of Patent: Feb. 21, 2017

(54) DOCUMENT FILE GENERATING DEVICE AND DOCUMENT FILE GENERATION METHOD

(71) Applicant: KYOCERA Document Solutions Inc., Osaka (JP)

(72) Inventor: Motoki Hiratsuka, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 19 days.

(21) Appl. No.: 14/604,701

(22) Filed: Jan. 24, 2015

(65) Prior Publication Data
US 2015/0215653 A1    Jul. 30, 2015

(30) Foreign Application Priority Data
Jan. 24, 2014  (JP) ................. 2014-011223

(51) Int. Cl.
| G06K 9/48 | (2006.01) |
| G06T 9/20 | (2006.01) |
| G06F 17/21 | (2006.01) |
| G06F 17/22 | (2006.01) |

(52) U.S. Cl.
CPC ......... G06F 17/214 (2013.01); G06F 17/2252 (2013.01); G06K 9/481 (2013.01); G06T 9/20 (2013.01)

(58) Field of Classification Search
CPC .... G06F 17/214; G06F 17/2252; G06T 11/60; G06T 9/20; H04N 19/94; H04N 19/124; G06K 9/481
USPC ....................................................... 382/239
See application file for complete search history.

(56) References Cited

U.S. PATENT DOCUMENTS

| 7,035,463 | B1* | 4/2006 | Monobe | G06T 7/0081 382/177 |
| 7,542,605 | B2* | 6/2009 | Yoshida | G06K 9/00463 382/176 |
| 7,596,271 | B2* | 9/2009 | Yaguchi | G06F 17/30271 382/181 |
| 7,944,581 | B2* | 5/2011 | Shepherd | G06F 17/214 345/471 |
| 2007/0086667 | A1* | 4/2007 | Dai | G06K 9/342 382/242 |

(Continued)

FOREIGN PATENT DOCUMENTS

JP    2005-063052 A    3/2005

OTHER PUBLICATIONS

Kurilin et al. ("Generation of PDF with vector symbols from scanned document," Proc. SPIE. 8653, Feb. 4, 2013).*

*Primary Examiner* — Yubin Hung
(74) *Attorney, Agent, or Firm* — Hawaii Patent Services; Nathaniel K. Fedde; Kenton N. Fedde

(57) ABSTRACT

Provided is to create a document file for drawing a picture finely, without increasing a file size. When a size of a first file computed before a process of vectorization is smaller than a size of a file of a manuscript, a process of vectorization is performed. When a size of a second file computed in the process of vectorization is smaller than the size of the file of the manuscript, a process after an end of the process of vectorization is performed. When a size of a third file computed in the process after the end of the process of vectorization is smaller than the size of the file of the manuscript, a vectorization file that is written in vectorized data is generated.

2 Claims, 11 Drawing Sheets

(56) References Cited

U.S. PATENT DOCUMENTS

| | | | |
|---|---|---|---|
| 2007/0230810 A1* | 10/2007 | Kanatsu | G06K 9/00456 382/243 |
| 2007/0237401 A1* | 10/2007 | Coath | G06K 9/6807 382/232 |
| 2008/0062437 A1* | 3/2008 | Rizzo | H04N 1/393 358/1.2 |
| 2008/0317381 A1* | 12/2008 | Tomita | H04N 1/00209 382/276 |
| 2009/0080000 A1* | 3/2009 | Kashibuchi | H04N 1/41 358/1.2 |
| 2009/0110287 A1* | 4/2009 | Bates | G06K 9/325 382/190 |
| 2009/0123075 A1* | 5/2009 | Yamazaki | G06F 17/30265 382/198 |
| 2009/0208130 A1* | 8/2009 | Kishi | G06K 9/481 382/266 |
| 2009/0290797 A1* | 11/2009 | Arakawa | G06T 11/60 382/177 |
| 2010/0171999 A1* | 7/2010 | Namikata | H04N 1/32101 358/530 |
| 2013/0033498 A1* | 2/2013 | Linnerud | G06F 9/3017 345/467 |
| 2013/0198173 A1* | 8/2013 | Kaburagi | G06F 17/30554 707/722 |
| 2014/0096041 A1* | 4/2014 | Gowen | G06F 3/0484 715/753 |
| 2014/0229426 A1* | 8/2014 | Gootee, III | G06F 17/5004 707/608 |

* cited by examiner

VECTOR IMAGE INFORMATION A

DRAWING OF EVERY CHARACTER
WRITTEN FOR PAGE 555 23 movet

. .
fill
34 43 moveto
xx xx xx xx xx xx recurve
xx xx xx xx xx xx recurve
xx xx rlinet
. .
closepath
fill
222 43 moveto

THE LABEL OF THE CHARACTER OF, FOR EXAMPLE, "K" IS ACQUIRED

MEMORIZE THE DISTANCE OF DOT FROM REFRENCE POINT TO THE MOST END IN EVERY DIRECTION

REFERENCE POINT D

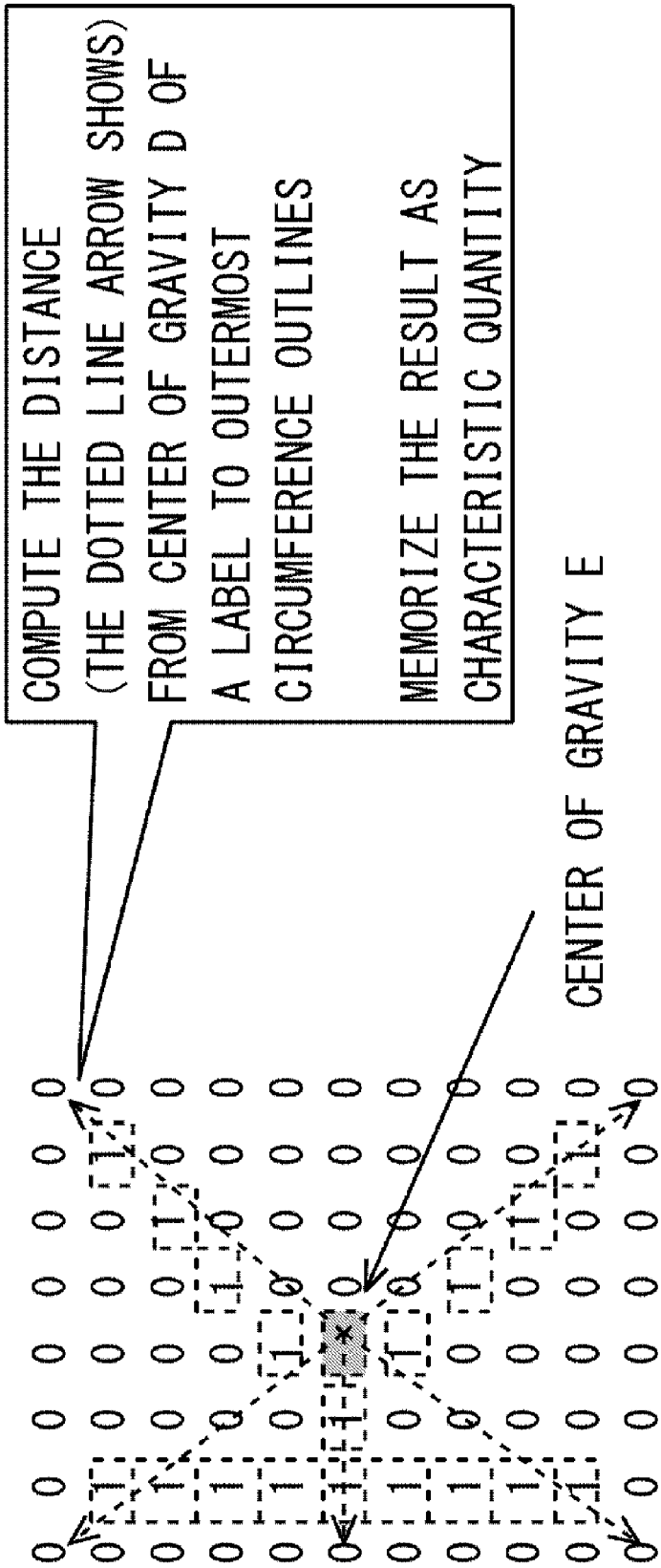

DOCUMENT FILE GENERATING DEVICE AND DOCUMENT FILE GENERATION METHOD

INCORPORATION BY REFERENCE

This application is, based on and claims, the benefit of priority from Japanese Patent Application No. 2014-011223 filed on Jan. 24, 2014, the contents of that are hereby incorporated by reference.

BACKGROUND

This disclosure is related with the document file generating device and document file generation method that makes data of character image of a manuscript obtained by character recognition, for example, generate document files, such as PDF (Portable Document Format) form.

There is PDF (Portable Document Format) form as a kind of the standard of electronic documents. The font information used for the file (henceforth a PDF file) of PDF form within a document can be embedded at the PFD file itself. Therefore, the PFD file that embedded the font can be drawn using the font embedded in the document as a maker's intention also except the environment that created it (a display or printing).

In PDF, when electrifying a document, in order to stop file size, high compression technology is used. This is identified in a picture layer (image layer) for every object called the character and figure that are contained in a picture, and image process and graphical data compression are made to be performed according to the object contained in each image layer. Thereby, high definition and high compression are attained simultaneously.

By the way, it is drawn by PDF, for example, vectorization of a character image is mentioned as one of the part that makes a character image draw finely.

However, if a character image is vectorized, it will be necessary to indicate drawing process of the vectorized font data on a PDF file, and will become large to text data.

When resolving such a problem, it is possible to apply the documentation method as shown, for example in patent documents 1. Namely, a documentation method has been proposed in patent documents 1, that comprising, inputting, as a table, the threshold value of the font name and the number of points (namely, size) that serve as a standard of whether to embed a font at a document file, a font name and the number of points that are used in it are gained from former data for process, if a font name currently used within former data is registered into a table, comparing the number of points in the former data with the number threshold value of points in a table, if there is a character of a larger point than a threshold value, determining to embed the font.

SUMMARY

A document file generating device accordance with the disclosure generates the document file that data-ized the character image of the manuscript obtained by character recognition. The document file generating device includes a vectorization part, a vectorization processing controlling part. The vectorization part vectorizes the character image. The vectorization processing controlling part controls processing of vectorization by the vectorization part. The vectorization processing controlling part, in the first step that is before the start of processing of the vectorization, computes the size of the first file based on the number of characters and character size of the character image. The vectorization processing controlling part, in the second step that is during execution of processing of the vectorization, computes the size of the second file based on the number of characters and character size of the character image that are extracted by collation with the character coordinates included in the data that vectorized with the character coordinates acquired by the character recognition. The vectorization processing controlling part, in the third step that is after the end of processing of the vectorization, computes the size of the third file based on the number of characters and the data that vectorized of the character image. The vectorization processing controlling part, in the first step—the third step, a document file generating device generating the vectorization file that wrote in the data vectorized by the vectorization part when the size of the first—the third file is smaller than the size of the file of the manuscript.

A document file generating method accordance with the disclosure generates a document file that data-ized a character image of the manuscript obtained by character recognition. The document file generating method includes a step of vectoring the character image by a vectoring part, and a step of controlling vectorization by the vectorization part by vectorization processing controlling step. The vectorization processing controlling part, in the first step that is before the start of processing of the vectorization, computes the size of the first file based on the number of characters and character size of the character image. The vectorization processing controlling part. The vectorization processing controlling part, in the second step that is during execution of processing of the vectorization, computes the size of the second file based on the number of characters and character size of the character image that are extracted by collation with the character coordinates included in the data that vectorized with the character coordinates acquired by the character recognition. The vectorization processing controlling part, in the third step that is after the end of processing of the vectorization, computes the size of the third file based on the number of characters and the data that vectorized of the character image. The vectorization processing controlling part, in the first step—the third step, a document file generating device generating the vectorization file that wrote in the data vectorized by the vectorization part when the size of the first—the third file is smaller than the size of the file of the manuscript.

BRIEF DESCRIPTION OF THE DRAWINGS

FIG. 9 is a figure for explaining the vectorization process using the vectorization and pattern matching in the document file generating device of FIG. 1.

FIG. 10A AND FIG. 10B are figures for explaining the vectorization process using the vectorization and pattern matching in the document file generating device of FIG. 1.

DETAILED DESCRIPTION

Figure 1:
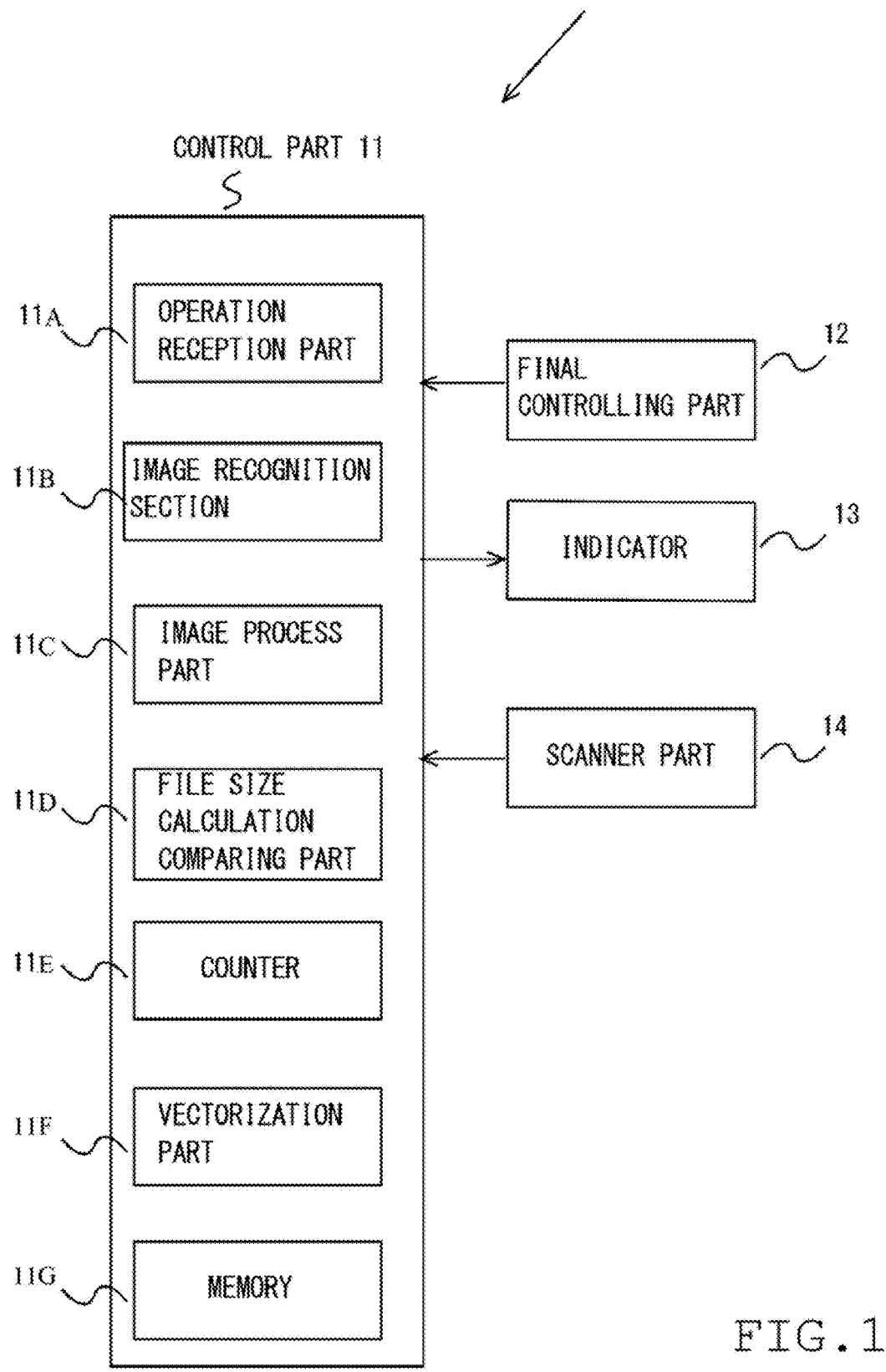
FIG. 1 is for describing one embodiment of the document file generating device of this disclosure.
Figure 2:
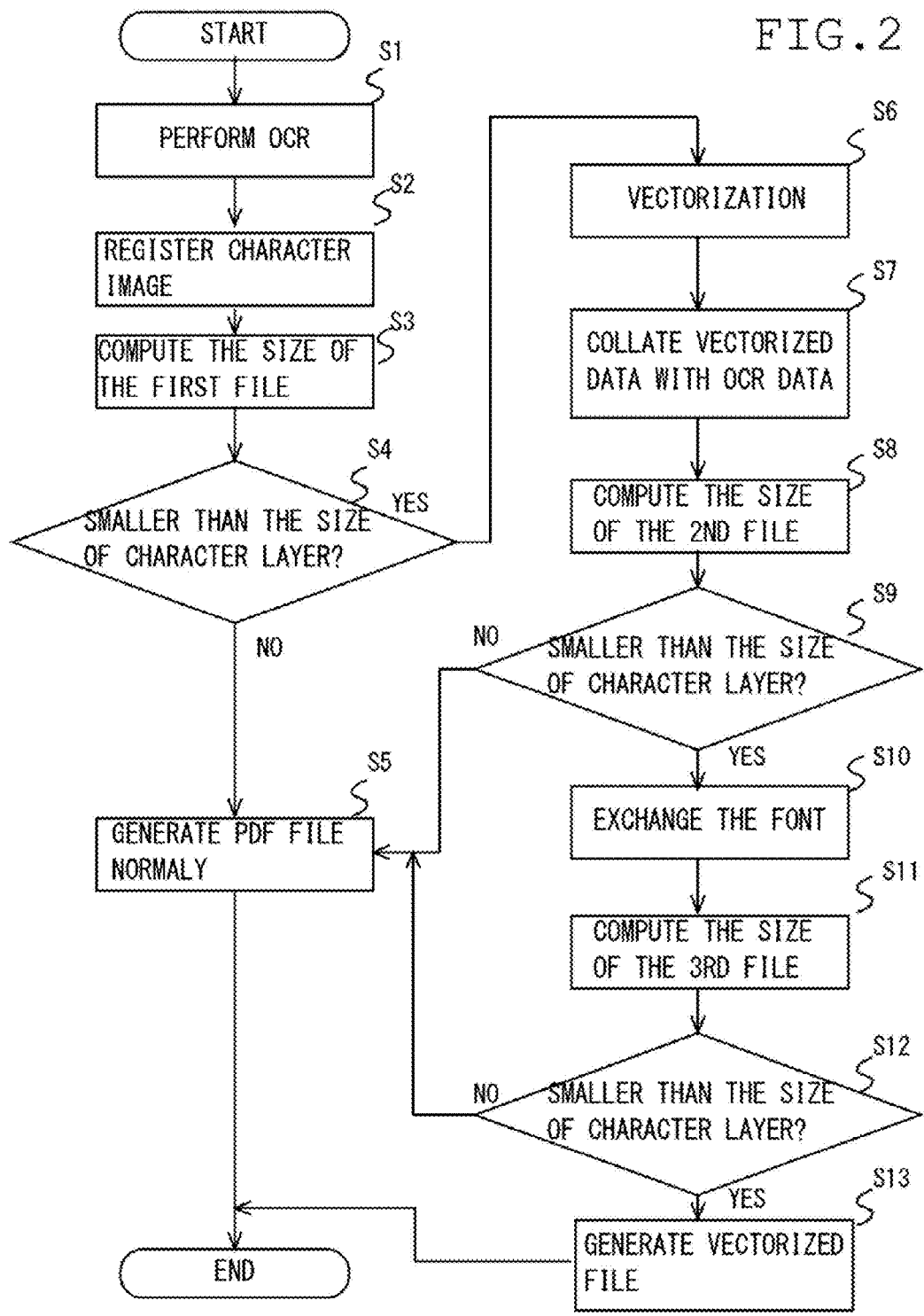
FIG. 2 is a flow chart for explaining the outline of the document file generation method by the document file generating device of FIG. 1.
Figure 3:
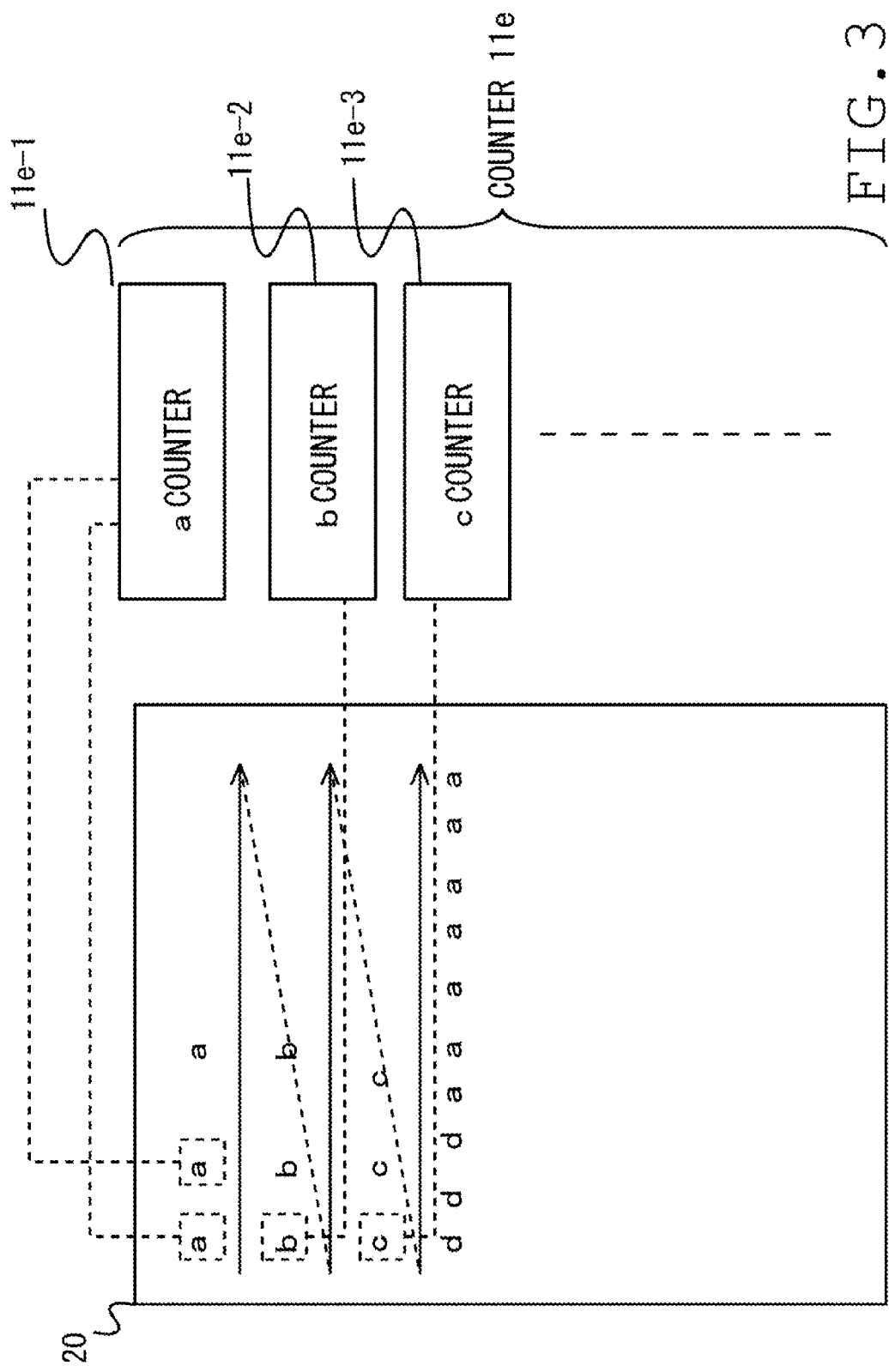
FIG. 3 is a figure for explaining the outline of image process by the document file generating device of FIG. 1.

Hereinafter, one embodiment of the document file generating device of this disclosure is described, referring to FIG. 1-FIG. 3. First, as shown in FIG. 1, document file generating device 10 is including control part 11, final controlling part 12, indicator 13, and scanner part 14.

Control part 11 is controls operation of the whole document file generating device 10 based on the predetermined program in ROM that is not illustrated, that has operation reception part 11a, image recognition section 11b, image process part 11c, file size calculation comparing part 11d, counter 11e, vectorization part 11f, and memory 11g.

Operation reception part 11a receives the operation concerning image process by final controlling part 12. Image recognition section 11b performs OCR (Optical Character Reader: character recognition) of the character image read by scanner part 14. That is, the character image read by scanner part 14 is compared with the pattern memorized beforehand, and is specified, and the data of the specified character image is obtained.

Image process part 11c performs generation of the document file (henceforth so-called "a vectorization file") that wrote in the data vectorized by vectorization part 11f, or the document file according to the file format of the below-mentioned manuscript 20. File size calculation comparing part 11d calculates size of a file in before a processing start of vectorization by vectorization part 11f (the first step), under processing execution of vectorization by vectorization part 11f (the second step), and after an end of processing of vectorization by vectorization part 11f (the third step) file size calculation comparing part 11d compare size of a file of the below-mentioned manuscript 20 with file size of the first step—third step respectively. The details are mentioned below.

Counter 11e counts the number (character number) for every character recognized by image recognition section 11b. Although vectorization part 11f vectorizes the character image recognized by image recognition section 11b, the details are also mentions below. The character image, or the like, that were read by scanner part 14 are memorized in memory 11g.

Final controlling part 12 is operated when directing image process, and it comprises a touch panel. Indicator 13 displays the message that guides image processor the like, the item as that image process is made to choose it, or the like, Scanner part 14 reads optically the character image of the below-mentioned manuscript 20 read by an image sensor (illustration abbreviation).

Next, the outline of image process is explained with reference to FIG. 2 and FIG. 3. First, for example OCR by reading of manuscript 20 as shown in FIG. 3 is performed by scanner part 14 (Step S1). Manuscript 20 shown in FIG. 3 is the document that printed a file (henceforth so-called "PDF file"). For convenience of explanation, only a character layer as that a character image of a-d is displayed.

That is, the PDF file has composition by the high compression technology with that image process and graphical data compression are performed according to the object contained in a picture layer (image layer), as mentioned above. The size (size of the data of the character layer of the PDF file before drawing) of the PDF file of manuscript 20 shall already be acquired.

Reading of manuscript 20 by scanner part 14 presupposes that one line is performed at a time sequentially from the upper row, as an arrow shows. Here, if manuscript 20 is read, whenever the new character image will be OCR, registration of the recognized character image respectively is performed by counter 11e (Step S2).

That is, if the character image of "a" is recognized first, the character image of the recognized "a" will be registered as a counter 11e-1 of counter 11e. Then, recognition of the character image of the following "a" will add the number of characters of a counter 11e-1. That is, whenever the character image of "a" is recognized, the number of characters of a counter 11e-1 is added.

Next, recognition of the character image of "b" will register the character image of the recognized "b" as b counter 11e-2 of counter 11e. Then, recognition of the character image of the following "b" will add the number of characters of b counter 11e-2. That is, whenever the character image of "b" is recognized, the number of characters of b counter 11e-2 is added.

Next, recognition of the character image of "c" will register the character image of the recognized "c" as c counter 11e-3 of counter 11e. Then, recognition of the character image of the following "c" will add the number of characters of c counter 11e-3. That is, whenever the character image of "c" is recognized, the number of characters of c counter 11e-3 is added.

Subsequently, after reading of manuscript 20 finishes, by file size calculation comparing part 11d, the size of the first file is computed from the number of sum total characters and average character image size of each character image of a counter 11e-1 and b counter 11e-2 and c counter 11e-3 (Step S3). That is, the size of the first file is computed by multiplying the average character image size by the number of sum total characters of the character image added to on each a counter 11e-1 and b counter 11e-2 and c counter 11e-3.

Here, the reason for using average character image size is because each character image sizes of "a"-"b" differ. When a hiragana is especially compared with a Chinese character, for example, in the direction of a Chinese character, character image size becomes large in many cases. In this case, that calculation will become complicated if it is going to calculate the size of the first file using each character image size. By using average character image size, calculation of the size of the first file becomes easy.

Then the size of the first file and the size of the character layer of a PDF file that were computed are compared (Step S4). When the size of the first computed file is larger than the size of the character layer of a PDF file (Step S4: NO), shift to vectorization of the character image by vectorization part 11f used as the next processing is interrupted by image processing part 11c, and the usual PFD file is generated (Step S5). Here, with the usual PDF file, it has the typical case file format that can embed the font information used within a document at the file itself.

The font registered by vectoring will be compressed and registered in a PDF file. Therefore, when calculating the size of the first file, it is necessary to take a compression ratio into consideration. The minimum compression ratio shall be used in this embodiment. That is, in a PDF file, for example, setup of the highest image quality (low compression), high quality, normal quality and low image quality (high compression) are possible, the size of the first file is computed as a thing using the compression ratio in the highest image quality (low compression). Thus, it becomes possible to generate the document file for drawing a picture finely by using the compression ratio in the highest image quality (low compression).

On the other hand, when the size of the first computed file is smaller than the size of the character layer of a PDF file (Step S4: YES), vectorization of the character image by vectorization part 11f is performed (Step S6). That is, vectorization of character image "a"~"c" is performed in a counter 11e-1, b counter 11e-2 and c counter 11e-3 of counter 11e mentioned above.

Next, the character coordinates acquired by OCR and the character coordinates of the vectorized data are tested by comparison in each character image added in a counter 11e-1, b counter 11e-2 and c counter 11e-3 is received by image process part 11c, extraction of an object character is performed (Step S7).

Incidentally, character coordinates, a character code, or the like, are contained in the OCR information acquired by OCR. The coordinates (position) of the starting point and end point of a line, etc. are included in the vectorized data. Therefore, extraction of an object character is attained by testing the character coordinates of OCR information and the vectorized data by comparison.

Next, from the number of sum total characters for every character image added by file size calculation comparing part 11d by font [of the extracted object character], a counter 11e-1, and b counter 11e-2, and c counter 11e-3, the size of the second file is computed by it being computed how many size becomes for every character (Step S8). Subsequently, the size of the second computed file is compared with the size of the character layer of a PDF file (Step S9).

When the size of the second computed file is larger than the size of the character layer of a PDF file (Step S9: NO), font replacement process used as the next process is not performed the usual PDF file is generated by image process part 11c (Step S5). On the other hand, when the size of the second computed file is smaller than the size of the character layer of a PDF file (Step S9: YES), font replacement process is performed by image process part 11c (Step S10). That is, vectorized data of each character image by vectorization part 11f performed at Step S6 is memorized by memory 11g mentioned above.

Next, the size of the third file is computed based on the vectorized data that is memorized by memory 11g by image process part 11c (Step S11). The size of the third file is computable from the vectorized data that is memorized by memory 11g, and the number of fonts used in the case of filing.

Then the size of the third file that were computed and the size of the character layer of a PDF file are compared (Step S12). Here, when the size of the third file is larger than the size of the character layer of a PDF file (Step S12: NO), generation of the vectorization file used as the next process is not performed, but the usual PDF file is generated by image process part 11c (Step S5).

On the other hand, when the size of the third file is smaller than the size of the character layer of a PDF file (Step S12: YES), generation of a vectorization file is performed by image process part 11c (Step S13).

As mentioned above, in this embodiment, The size of the first file is computed from the number of sum total characters of a character image and average character image size that are obtained by OCR in the stage (the first step) before the start of processing of vectorization of each character image by vectorization part 11f in Step S6, by collation with OCR information and the character coordinates of the vectorized data in the stage (the second step) under execution of process of vectorization by vectorization part 11f, the size of the second file, obtained from the number of sum total characters for every character image added in a counter 11e-1, and b counter 11e-2 and c counter 11e-3 and font of the extracted object character, is computed, in the stage (the third step) after the end of process of vectorization by vectorization part 11f, the size of the third file obtained from the data vectorized and the number of fonts used in the case of making a file is computed.

Then, by comparing the size of a file that were computed in each stage and the size of the character layer of a PDF file, If the size of the third final file is smaller than the size of the character layer of a PDF file, vectorization file is generated.

Next, the example of image process mentioned above is explained. FIG. 4-FIG. 8 illustrate the vectorization processing for the reduction in the size of the document file using vectorization and OCR. Image process part 11c mentioned above shall perform vectorization process explained below.

Figure 4:
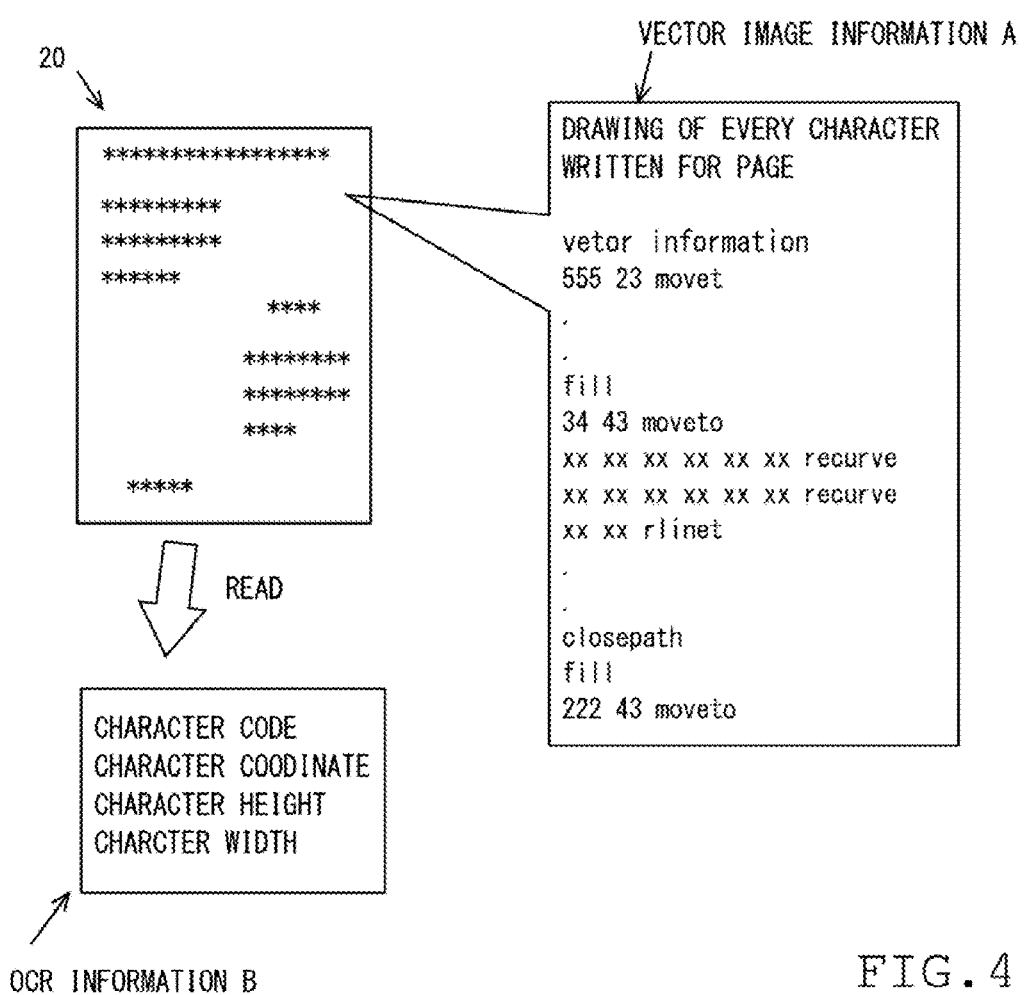
FIG. 4 is a figure for explaining the vectorization process using the vectorization and OCR (optical character recognition) in the document file generating device of FIG. 1.

First, as shown in FIG. 4, by scanning manuscript 20 by scanner part 14 that is mentioned above, a character image and OCR information b are acquired. As mentioned above, vector image information (vector data) a is information on the PDF file of manuscript 20 itself, it is shall already be acquired. Font dictionary c explained below is contained in the PDF file.

Since the character drawn cannot specify from vector image information (vector data), a character code and character coordinates are acquired from OCR information b, and they are registered to font dictionary c by the following procedures.

Figure 5:
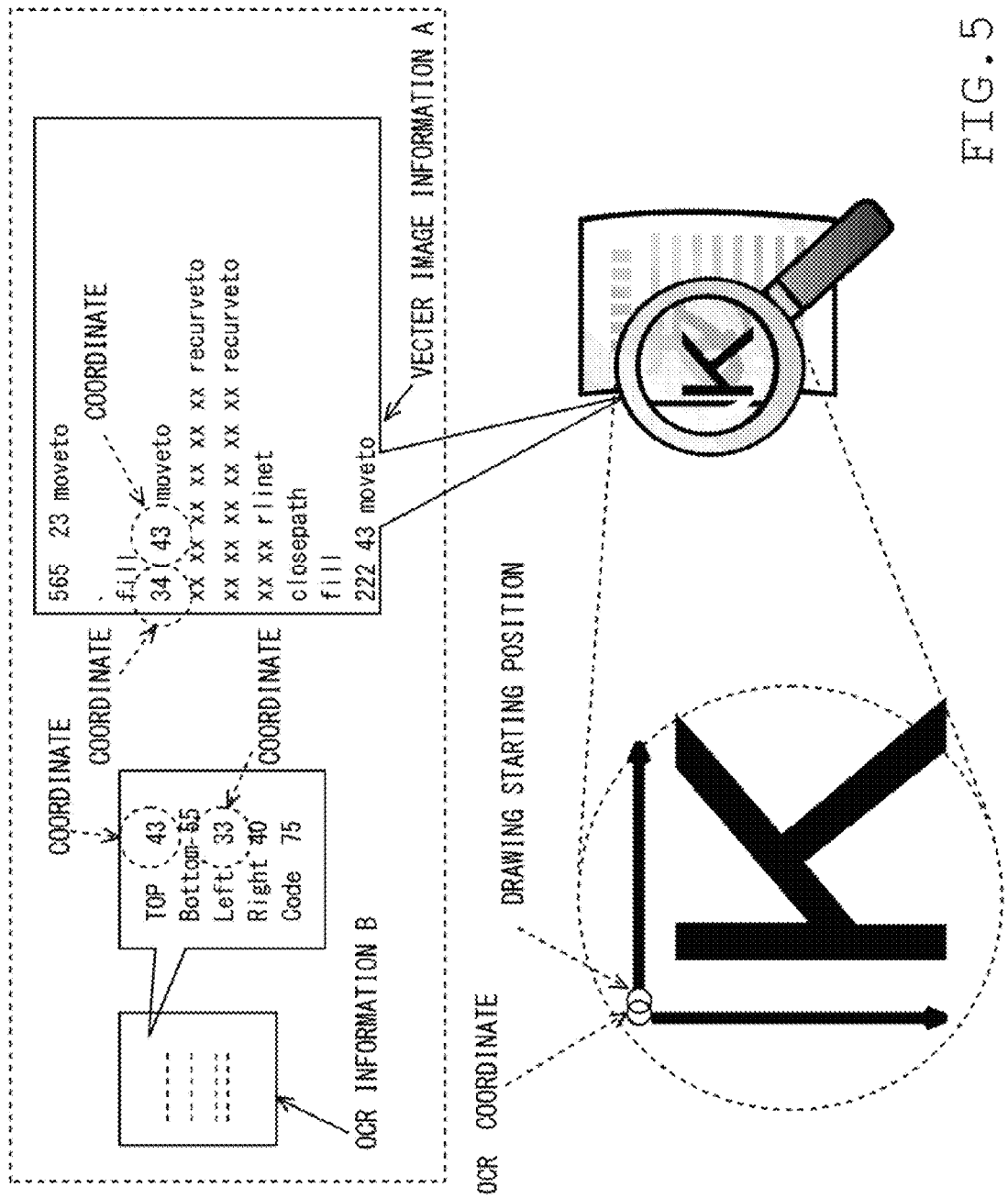
FIG. 5 is a figure for explaining the vectorization process using the vectorization and OCR in the document file generating device of FIG. 1.
Figure 6:
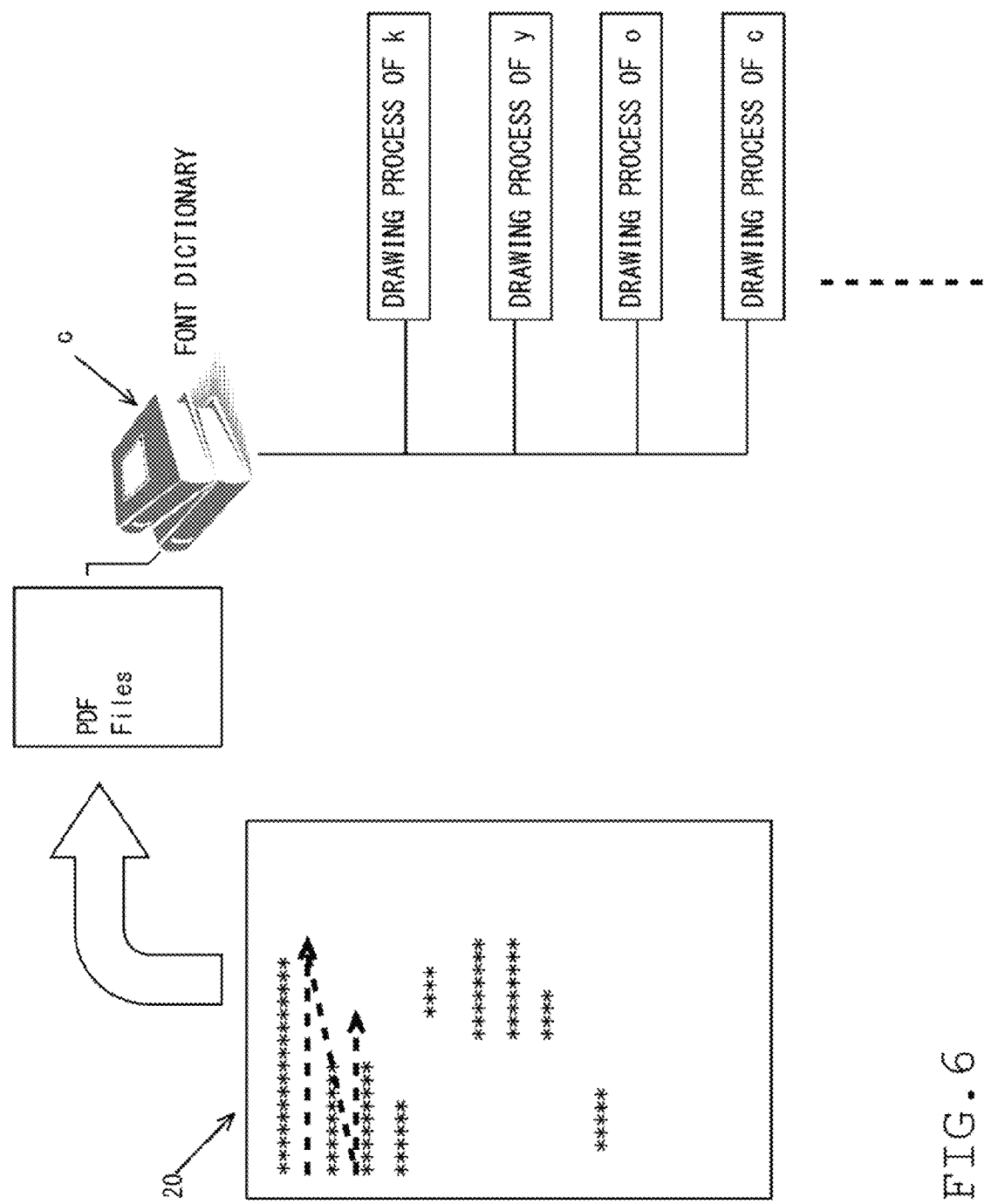
FIG. 6 is a figure for explaining the vectorization process using the vectorization and OCR in the document file generating device of FIG. 1.

That is, be shown in FIG. 5 and FIG. 6, (1) For example, "K", if the character image of "K" is read by OCR, X coordinates of the drawing starting position that is in agreement between right end and the left end of the character image of "K" will be searched from OCR information b. (2) When OCR coordinates (character coordinates of OCR information b) corresponds to X coordinates of the drawing starting position of vector image information a, Y coordinates of the drawing starting position that is in agreement between lower end and the upper end of Y coordinates are searched. (3) When both corresponds, judge it as an applicable character and register with font dictionary c by making even fill of vector image information a into a character. (4) When a registered character is already found in search, the character is not registered on font dictionary c.

As shown in FIG. 6, when the character registered into font dictionary c is "K", "y", "o", and "c", each character will be read from font dictionary c in the case of drawing process.

Figure 7:
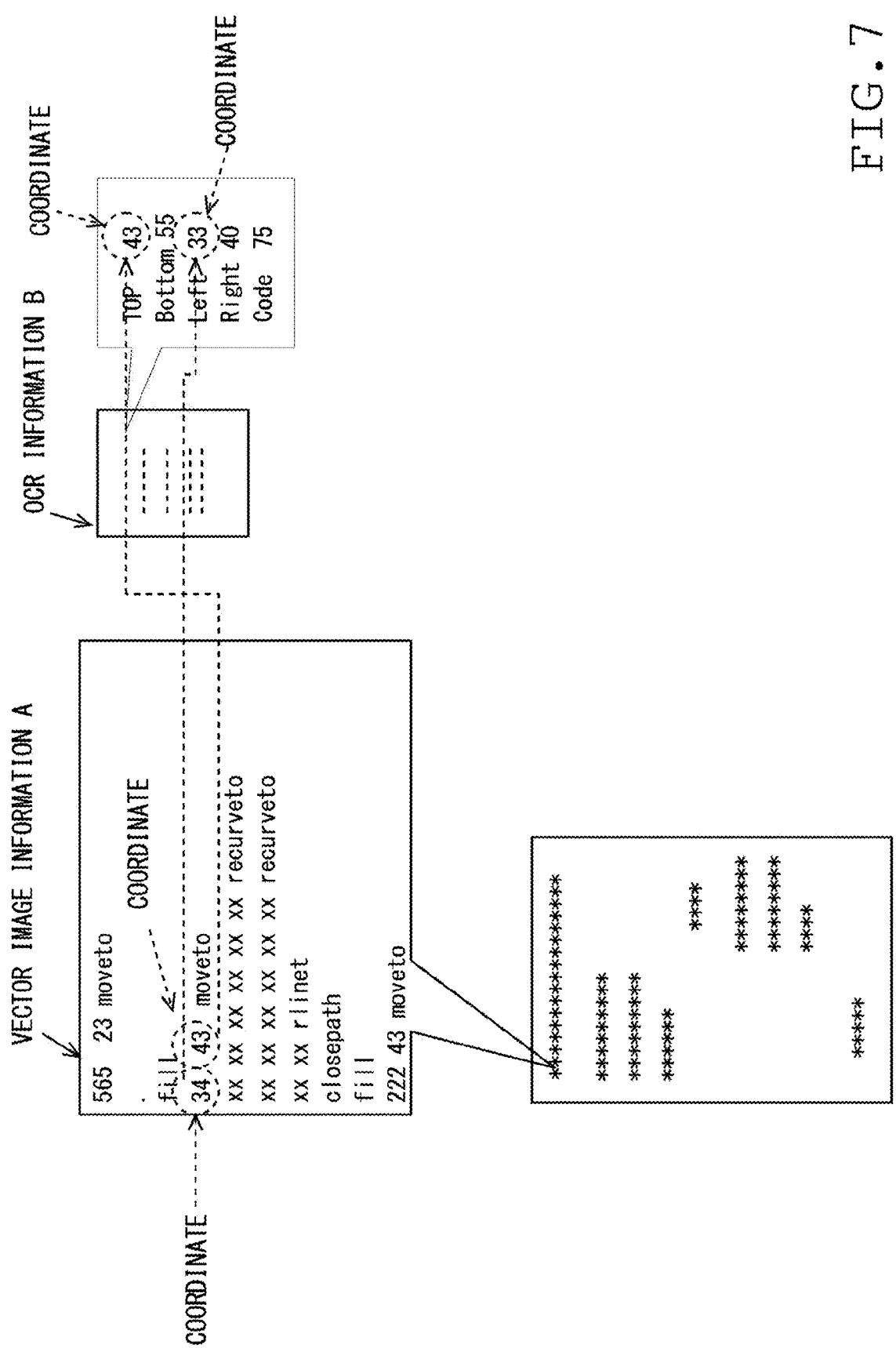
FIG. 7 is a figure for explaining the vectorization process using the vectorization and OCR in the document file generating device of FIG. 1.

Next, as shown in FIG. 7, if search to EOF (termination of data) of vector image information a is finished, a search will be performed from the vector coordinates of vector image information a to OCR information b. Here, since there may be a character that cannot be recognized by OCR, the character is searched again in vector image information a by the following procedures.

(5) Search a character in that the coordinates of the beginning starting position of vector data is not in agreement with the coordinates of the character recognized by OCR. (6) The another recognized sign and since it is already registered to font dictionary c, cancel the congruous characters.

(7) A conflicting character carries out additional registration of the vector sequence collectively at one font dictionary c. Here, 90 percent or more, although the block of a conflicting character can be performed, since it registers with font dictionary c, it leads to reduction of the size of a file.

Figure 8:
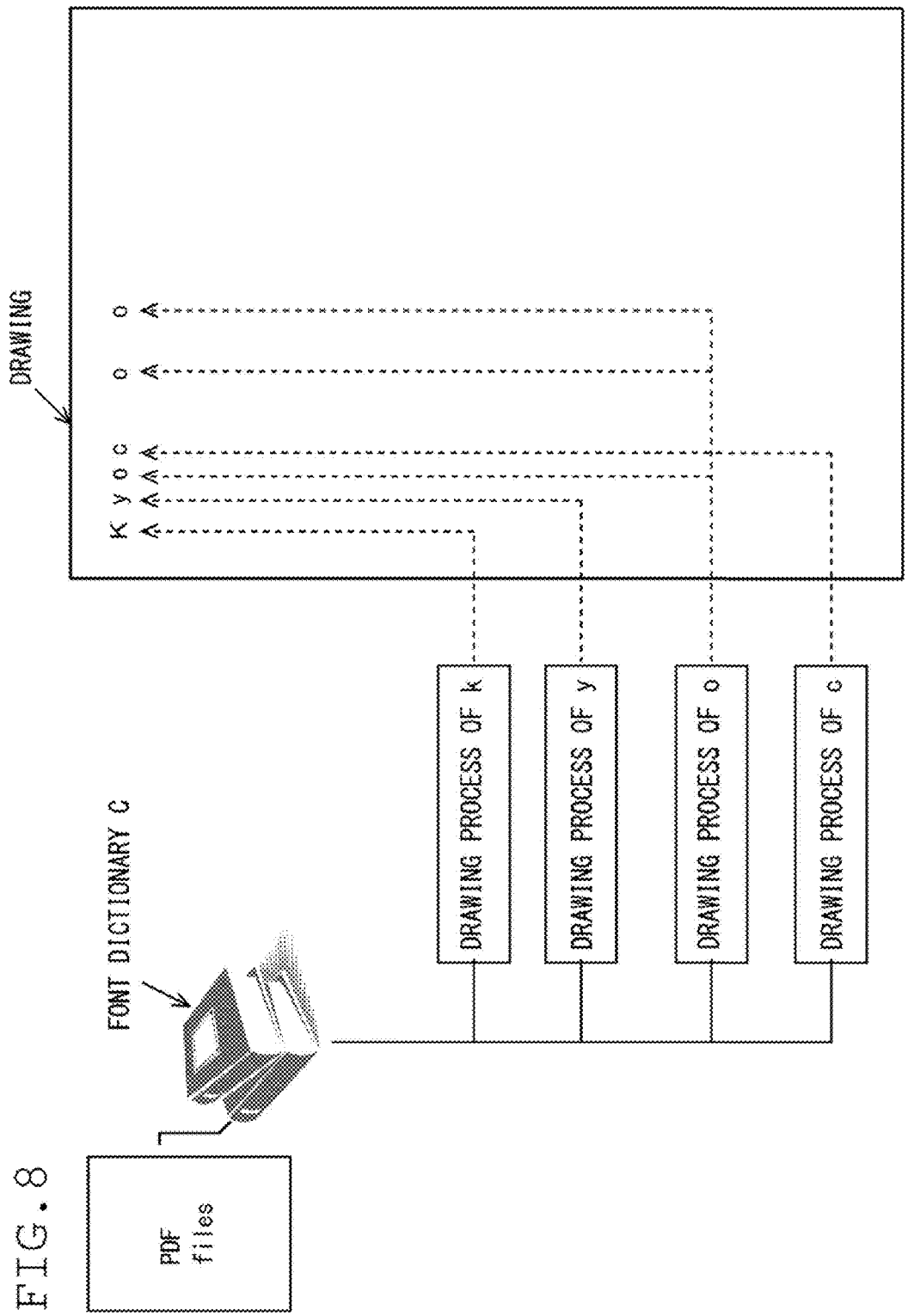
FIG. 8 is a figure for explaining the vectorization process using the vectorization and OCR in the document file generating device of FIG. 1.

Next, be shown in FIG. 8, (8) Acquire a font from font dictionary c that registered the character, drawing process is performed with specifying size and written coordinates. That is, when drawing "K", "y", "o", "c", "o", and "o", for example, the font of each character will be acquired from font dictionary c.

Next, with reference to FIG. 9, or the like, the vectorization process for vectorization and the reduction in the size of the document file using pattern matching is explained. Image process part 11c mentioned above shall perform the pattern matching explained below.

First, as shown in FIG. 9, manuscript 20 is scanned by scanner part 14 mentioned above, a character image is acquired, and the following procedures perform registration to font dictionary c. That is, be shown in FIG. 10 (a), (1) Discover the element that has the same luminosity in the neighborhood pixel of the binary format image before vectorization, and create a label. Here, the label of the character of, for example, "K" is acquired. (2) Memorize the coordinates of the place of reference point d at the time of label acquisition, and dot width in every direction. (3) Search is performed to the written coordinates in a character image. (4) Search the coordinates that are in agreement with X coordinates between right ends from the left end of a character image from vector image information a. (5) When X coordinates in agreement are searched, search Y coordinates between the upper end of a character image, and a lower end, and coordinates in agreement from vector image information a. (6) When both are in agreement, judge it as an applicable character, and register even fill of vector image information a as a character on with font dictionary c that mentioned above. (7) When a registered character is already found in search, don't perform registration to font dictionary c.

Next, be shown in FIG. 10 (b), (8) The position of center of gravity e of a label is decided, and the characteristic quantity of the label from the position concerned is computed. Characteristic quantity is the distance (the dotted line arrow shows) from center of gravity d of a label to outermost circumference outlines. Therefore, even if an object label carries out expansion/reduction, and rotation, it becomes possible to make it in agreement with the cycle of the feature. (9) Search the character corresponds to characteristic quantity from vector image information a. (10) Memorize the coordinates of the congruous characters, and width in every direction. (11) Repeat (9) and (10) until a character stops finding. (12) Acquire the following label and perform the same pattern matching as the above. At this time, the character and coordinates that were memorized are removed from the following retrieval object. (13) In the case of drawing process, a font is acquired from font dictionary c and size and written coordinates are specified.

Thus, in this embodiment, it has vectorization part 11f that is a vectorization part to vectorize a character image, and the vectorization process controlling part that controls process of vectorization by this vectorization part 11f.

A vectorization processing controlling part compares the size of the first file with the size of the file of manuscript 20 that were computed in the first step that is before the start of processing of vectorization, when the size of the first file is smaller than the size of the file of manuscript 20, go to the second step that is during execution of processing of vectorization, when the size of the second file computed in the second step is smaller than the size of the file of manuscript 20, go to the third step that is after the end of processing of vectorization, When the size of the third file computed in the third step is smaller than the size of the file of manuscript 20, a vectorization processing controlling part generates the vectorization file that wrote in the data vectorized by vectorization part 11f.

The vectorization process controlling part specifically has counter 11e that is a counting part that counts the character image of manuscript 20 obtained by character recognition for every character image, file size calculation comparing part 11d that is a file size calculation comparison part to compute and measure the size of a file, image processing part 11c that is an image processing part that generates a vectorization file or a document file.

File size calculation comparing element 11d, in the first step, computes the first file that multiplied the number of characters of the character image by each character image size, in the second step, extracts an object character by collation with the character coordinates acquired by character recognition and the character coordinates included in the vectorized data, computes the second file that multiplied by the size of the font of the object character extracted by the number of characters of the character image, in the third step, computes the size of the third file that multiplied the number of characters of the character image by the data based on vectorization, in either the first step, the second step or the third step, compares the size of the first—the third file with the size of the file of a manuscript.

Image processing part 11c, when the size of the first—the third file is smaller than the size of the file of a manuscript in the first step—the third step, generates a vectorization file, when the size of the first—the third file is larger than the size of the file of manuscript 20 in either the first step, the second step or the third step, subsequent processes are interrupted and the document file according to the file format of the file of manuscript 20 is generated.

When the size of the third file is smaller than the size of the file of manuscript 20 by comparison in the third step, since the vectorization file that wrote in the data vectorized becomes smaller than the size of the file of manuscript 20, without increasing file size, it is possible to generates the document file for drawing a picture finely.

When the size of the first—the third file is larger than the size of the file of manuscript 20 in either the first step, the second step or the third step, since subsequent processes are interrupted, unnecessary processes can be excluded.

When the size of the first file is computed by file size calculation comparing part 11d, since the number of sum total characters of each character image counted at counter 11e is multiplied by the ability of the average character image size that equalized the size of each character image to take advantaging, the size of the first file is easily computable.

Since, by image processing part 11c, the vectorization data of the character image that is in agreement by collation with the character coordinates acquired by character recognition and the character coordinates included in the vectorized data is registered into font dictionary c, and the vectorization file is made to be generated using this registered vectorization data, vectorization of the character image obtained by character recognition can be ensured and easily.

Since, by image processing part 11c, the vectorization data of the character image that is in agreement with the characteristic quantity obtained from the pattern of the character image obtained by character recognition is registered into a font dictionary, the vectorization file is made to be generated using this registered vectorization data, Vectorization of the Character Image Obtained by Character Recognition can be Ensured and Easily Like the Above.

Since the registered character is not registered when performing registration to font dictionary c, even if the character images that should be registered increase in number, it is possible to control that file size increases.

In a typical case, when the document information that can include font information is created, since he is trying to pay his attention not only to the name of a font but to the number of points of a font (namely, size), reduction of the size of the document file created is possible.

For example, when the number of points, or the like, are given for every font, the pattern for every font is needed, there was a problem that file size will become large as the number of fonts registered increased.

This disclosure is made in view of such a situation, and aims at providing the document file generating device and document file generation method that can generate the document file for drawing a picture finely without increasing file size.

What is claimed is:

1. A method for generating a document file based on character images of a manuscript obtained by optical character recognition (OCR), the method comprising:
   via a document file generation device,
   performing OCR on the character images of a manuscript read by a scanner part of the document file generation device;
   registering each of the character images of the manuscript recognized by the OCR;
   computing a size of a first file by multiplying the number of sum total characters of the recognized character images by a computed size based on the character images;
   comparing the computed size of the first file with the size of the character layer of a first PDF file related to said manuscript;
   generating a second PDF having a file format that embeds a font information when the computed size of the first file is larger than or equal to the size of the character layer of the first PDF file; otherwise
   performing vectorization of the character images to provide vectorized character images;
   for each of the character images, extracting an object character by comparing character coordinates acquired by the OCR with character coordinates of the respective vectorized character image;
   computing a size of a second file by multiplying the number of the sum total characters of the character images by a computed size based on the extracted object characters;
   comparing the computed size of the second file with the size of the character layer of the first PDF file;
   generating the second PDF when the computed size of the second file is larger than or equal to the size of the character layer of the first PDF file; otherwise
   performing a font replacement process and storing the vectorized character images in a memory of the document file generation device;
   computing a size of a third file by multiplying the number of characters used for generating a vectorization file by a computed size based on the vectorized character images;
   comparing the computed size of the third file with the size of the character layer of the first PDF file;
   generating the second PDF when the computed size of the third file is larger than or equal to the size of the character layer of the first PDF file; otherwise
   generating the vectorization file.

2. The method for generating the a file according to claim 1, wherein the step of computing the size of the first file is performed by multiplying the number of sum total characters of the recognized character image by an average size of the character images.

* * * * *